United States Patent
Dickerson

(10) Patent No.: US 10,228,513 B2
(45) Date of Patent: Mar. 12, 2019

(54) SELECTIVE ARRAYED WAVEGUIDE SPECTROMETER

(71) Applicant: SB MICROSYSTEMS, Glen Burnie, MD (US)

(72) Inventor: Michael Dickerson, Frederick, MD (US)

(73) Assignee: SB MICROSYSTEMS, Glen Burnie, MD (US)

( * ) Notice: Subject to any disclaimer, the term of this patent is extended or adjusted under 35 U.S.C. 154(b) by 0 days.

(21) Appl. No.: 15/800,504

(22) Filed: Nov. 1, 2017

(65) Prior Publication Data

US 2018/0128980 A1 May 10, 2018

Related U.S. Application Data

(60) Provisional application No. 62/415,615, filed on Nov. 1, 2016.

(51) Int. Cl.
| | | |
|---|---|---|
| *G01J 3/28* | (2006.01) | |
| *G02B 6/12* | (2006.01) | |
| *G01J 3/02* | (2006.01) | |
| *G01J 3/44* | (2006.01) | |

(52) U.S. Cl.
CPC ........ *G02B 6/12019* (2013.01); *G01J 3/2803* (2013.01); *G01J 3/02* (2013.01); *G01J 3/44* (2013.01)

(58) Field of Classification Search
CPC ....... G01J 3/02; G01J 3/28; G01J 3/18; G02B 6/26; G02B 6/34
See application file for complete search history.

(56) References Cited

U.S. PATENT DOCUMENTS

| | | |
|---|---|---|
| 5,136,671 A | 8/1992 | Dragone |
| 6,266,464 B1 | 7/2001 | Day et al. |
| 6,389,201 B1* | 5/2002 | Urino ................. G02B 6/12016 385/43 |
| 6,643,059 B1 | 11/2003 | Grant et al. |
| 6,678,446 B1 | 1/2004 | McGreer et al. |
| 7,031,568 B2* | 4/2006 | Ian Laming .............. G01J 3/28 374/E17.002 |
| 7,158,699 B2* | 1/2007 | Welch .................... B82Y 20/00 385/14 |
| 7,212,708 B2 | 5/2007 | Cheng et al. |
| 2002/0001089 A1* | 1/2002 | Price ...................... G02B 21/22 356/601 |
| 2014/0085633 A1 | 3/2014 | Preston et al. |

OTHER PUBLICATIONS

"Optics, Introduction to Diffraction Grating," www.thorlabs.com, Gratings, pp. 798-803, 808 (retrieved Sep. 30, 2016).

(Continued)

*Primary Examiner* — Abdullahi Nur
(74) *Attorney, Agent, or Firm* — Cermak Nakajima & McGowan LLP; Adam J. Cermak

(57) ABSTRACT

A spectrometer includes a one or more Arrayed Waveguide Gratings (AWGs), which have output waveguides which are non-uniformly spaced at the output slab and/or with different passband widths. AWGs can be cascaded, each receiving a different portion of the spectrum passing through an upstream AWG, for further processing and/or detection.

7 Claims, 4 Drawing Sheets

(56) References Cited

OTHER PUBLICATIONS

Nguyen, V. D., et al., "Spectral domain optical coherence tomography imaging with an integrated optics spectrometer," Optics Letters 2011;26(7):1293-1295.
Akca, B. I., et al., "Broad-spectral-range synchronized flat-top arrayed-waveguide grating applied in a 225-channel cascaded spectrometer," Optics Express 2012;20(16):18313-19318.
International Search Report and Written Opinion for PCT Patent App. No. PCT/US2017/059484 (dated Jan. 17, 2018).

* cited by examiner

SELECTIVE ARRAYED WAVEGUIDE SPECTROMETER

BACKGROUND

Field of Endeavor

The present invention relates to devices, systems, and processes useful as spectrometers.

Brief Description of the Related Art

Spectrometers are responsible for detecting electromagnetic radiation (that may be ultraviolet, visible, or infrared) corresponding to some measured parameter, for example, element concentration. Most current spectrometer designs use a configuration that relies upon the introduction of an element that causes dispersion (or frequency/wavelength-based spreading of the signal) into the path of EM radiation originating from an object of substance of interest, including, but not limited to, that in and around the visible spectrum. This element can be a ruled holographic grating or a simple prism. Once the signal is sufficiently dispersed, an array of detectors for that specific frequency band is placed carefully in the signal path. FIG. 1 illustrates a simple spectrometer, having a prism 4 into which EM radiation 2 enters, is refracted by the prism in a known way, exits the prism as dispersed radiation 6 (e.g., when including radiation in the visible spectrum, into constituent spectral colors), and impinges on and is detected by a CCD array 8.

A traditional optical spectrometer can be made in a very wide variety of ways. Their overall purpose is to divide the incoming light into its constituent components and detect each component. The first basic requirement to accomplish this function is a dispersive element of some sort that divides that light. It can be a holographic grating, prism, or many other novel approaches. They may involve the motion of an element in the optical path, or there may be a stationary element. Then, a detector must be provided. In a scanning-type device, a single detector is scanned across the image plane of the dispersive element. In a stationary-type, a detector array is placed at the image plane. The stationary-type is used when the lifetime of the spectrum to be measured is shorter than a scanning-type spectrometer can support. The scanning-type is used for quasi-static measurements.

A very common type of spectrometer is the Czerny-Turner (CZ), wherein the dispersive element is an optical grating and the detector is a stationary CCD array. The CZ design also contains an entrance slit to spatially limit the input light. Resolution in the CZ is a function of the CCD resolution, the pitch of the grating, and the optical path length between the grating and the CCD.

Traditional design of a spectrometer (or similarly, a monochromator) results in a tradeoff between spectral range and resolution for the final device. This is a function of the resolution available in the detector array. Thus, a higher resolution device requires a narrower band of energy to be dispersed on a single element in the array. For a given detector array, this results in a reduction in the total range that the spectrometer may cover.

For some applications, continuous inclusive coverage from the start to the stop wavelength of the EM radiation is not required. Instead, the detection of only specific wavelengths is required, although they may require differing spectral widths around that band. These wavelengths are also not necessarily evenly spaced, relative to one another.

In traditional spectrometer design, the regions where the device is designed to detect energy but where there are no wavelengths of interest are wasted, contributing to increased cost and size of the spectrometer.

Wavelength Division Multiplexed (WDM) transmission systems have been used in the past in telecommunications systems. These systems require the separation of multiple wavelengths carried in a single optical fiber into multiple fibers, each carrying a separate wavelength. Most designs use an optical power splitter and discrete filters, but this design would not significantly improve cost or size if implemented as a spectrometer. Arrayed Waveguide Gratings (AWG) can have significant advantages over the optical power splitter configuration, but AWG systems were never widely adopted in telecommunications systems, and thus manufacturing of AWGs for telecommunications use has effectively ceased.

Thus, there remains a need for application-specific spectrometers at a cost and size that is many orders of magnitude lower than those currently available, and which can thus open diagnostic and analytic spectroscopy to consumer applications.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
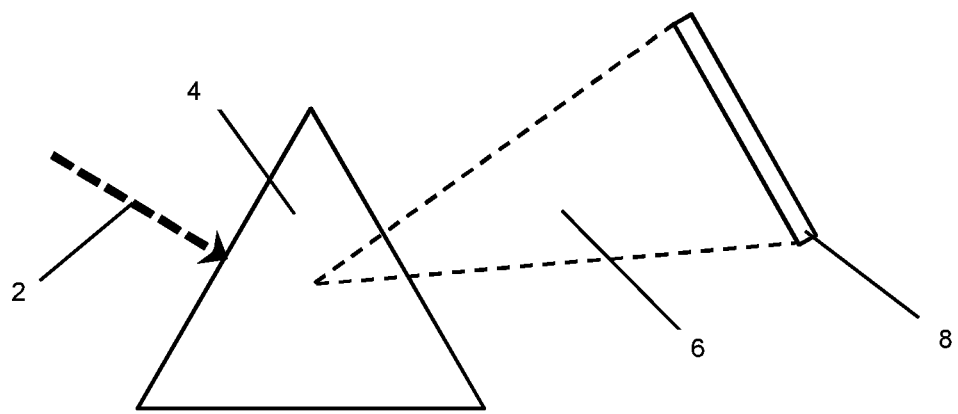
FIG. 1 illustrates a simplified version of a prior spectrometer.

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

In general terms, the subject matter of this application includes a spectrometer which includes an AWG configured with desired or required center wavelengths and bandwidths, while being low cost and small. Rather than being continuous in the manner of current spectrometers, that is, which are structured to detect EM radiation in a continuous band using multiple detectors, spectrometers described herein are structured to be selective in which bands EM radiation is detected. As described in greater detail below, the spectrometers described herein can be configured to detect EM radiation within only portions of the EM spectrum, with optional different detection band widths centered on different center wavelengths.

Figure 2:
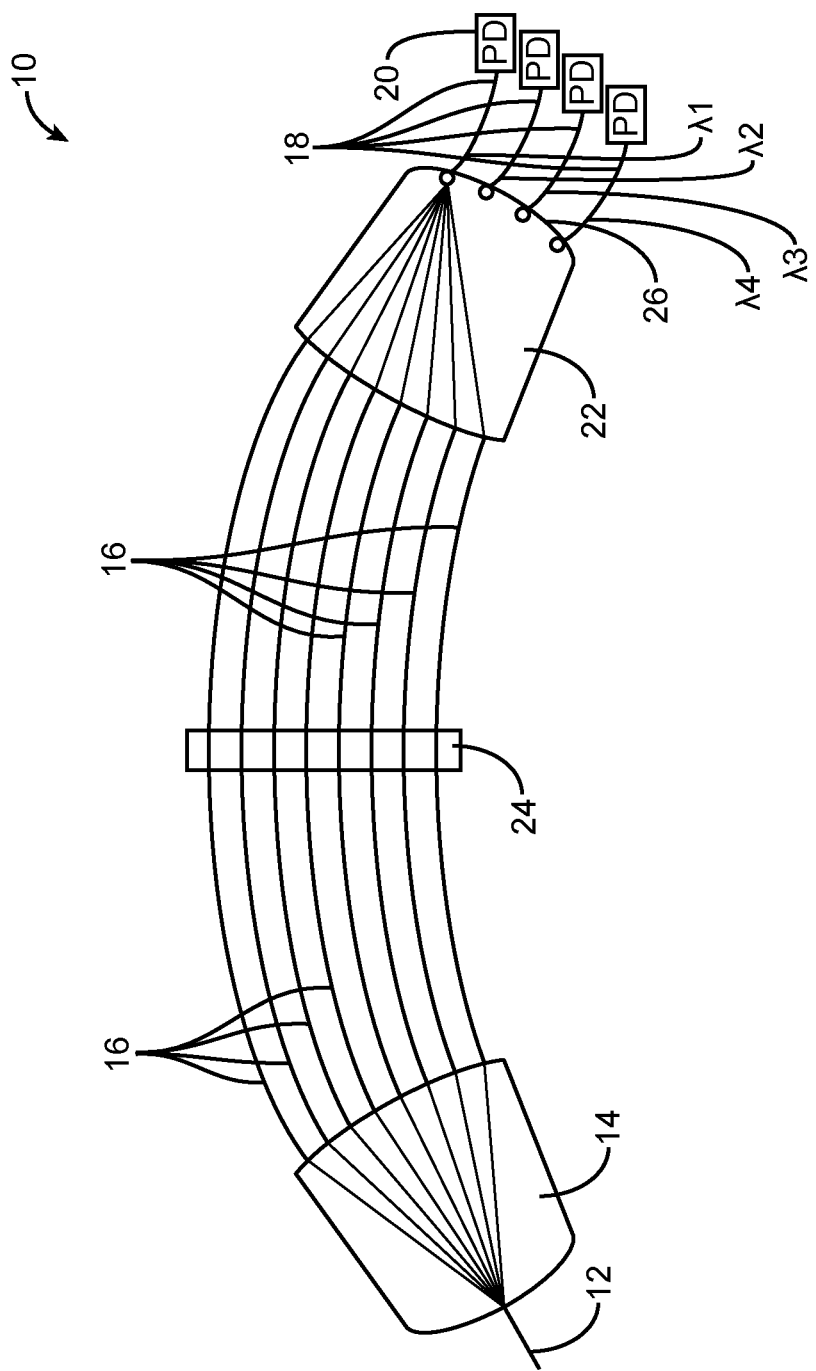
FIG. 2 illustrates a portion of a spectrometer in accordance with principles of the present invention.

An AWG 10 in accordance with principles of this application is illustrated in FIG. 2, and can be fabricated using simple planar optical waveguide technology, one exemplary embodiment being Silicon on Insulator (SOI). Thus, it can be manufactured to high tolerances and with standard photolithographic techniques, thereby driving the cost down. An input waveguide 12 directs 'light' (in general, EM radiation from a source of interest) to the input side of an input slab waveguide 14 such as those in traditional AWGs. Optical waveguides 16 at the output of an output slab waveguide 14 determine the center of the passband and need not be evenly spaced. The spectral width of each passband is adjusted through additional parameters, including the slab waveguide size and the difference in path length between the waveguides. Additionally, the AWG 10 can be easily cascaded with additional AWGs, such that the output of one AWG serves as the input to another (see FIG. 3). By using this technique, the desired characteristics of the spectrometer can be further customized for the specific application. Finally, single unit photodetectors 20 (PD) can be easily placed at the final output waveguides 18. When arrayed, the device does not suffer from the same dispersion-to-length ratio requirements of traditional spectrometers and can be made very small (~1 cm$^2$).

As used herein, a photodetector 20 can be any of numerous currently available devices, including either a photovoltaic or photoconductive diode that responds to the presence of an optical signal on one of its surfaces. Upon the implementation in a circuit and with application of a bias, the device will produce a current proportional to the incident optical power, often expressed in Amps/Watt as the responsivity. The device's responsivity will vary with incident optical wavelength as a function of the type of material, since the majority of such devices are sensitive only to frequencies of light above their bandgap energy. Therefore, in this disclosure, several photodetector material types may be used to cover an entire range, e.g., from 200-800 nm, inclusive, that is of interest. Because each individual output channel of the AWGs described herein will be composed of individual detectors (unlike most conventional spectrometers that use a monolithic array, all of the same material), each can have a different active material and the overall sensitivity of the device can be enhanced.

In general terms, spectrometers described herein include passive optical structures fabricated to maintain waveguide characteristics for the frequencies/wavelengths of interest for the application. An input optical waveguide 12 (fiber or planar) is coupled to an input slab waveguide 14. The input slab waveguide 14 is responsible for distributing light to a number of conventional optical waveguides 16 on the distal (output) side of the input slab.

An array of traditional optical waveguides 16 is connected to the distal side of the input slab waveguide 14 and to the near (input) side of an output slab waveguide 22. The optical waveguides 16 connecting the input and output slab waveguides have different optical path lengths, incremented by a common length $\Delta l$; for traditional AWGs, this is the standard configuration. For example, if the reference (shortest) waveguide has an optical length $l_0$, the second waveguide has a length $l_0+\Delta l$, the third has a length $l_0+2\Delta l$, etc. This configuration sets a constant wavefront tilt, and thus dispersion of the EM radiation (e.g., light) transmitted through the waveguides. The resolution of the resulting spectrometer is thus a function of this wavefront tilt.

In the path of the traditional optical waveguides, additional elements 24 may be introduced as long as they don't introduce any wavefront tilt distortion. For example, a waveplate may be inserted that compensates for any polarization mode dispersion or polarization dependent loss that could be encountered.

An output optical slab waveguide 22 is responsible for distributing light from each of the waveguides 16 of the array to specific points on the distal end of the output slab. The inner surface of the distal (output) side 26 of the slab waveguide can be thought to have the dispersion characteristics necessary that an array of photodetectors (e.g., CCD array) could be placed as in a traditional spectrometer, which is one embodiment of a spectrometer as described herein. In such an embodiment, the photodetector (CCD) array would need to be placed precisely, thus incurring additional costs.

In a particularly preferred embodiment, traditional output waveguides (OW) will be precisely placed at the distal (output) end 26 of the output slab waveguide in locations that correspond to the wavelength of interest for the spectrometer. These output waveguides are advantageously, yet still optionally, an integral part of the design of the device's mask for photolithography.

Figure 4:
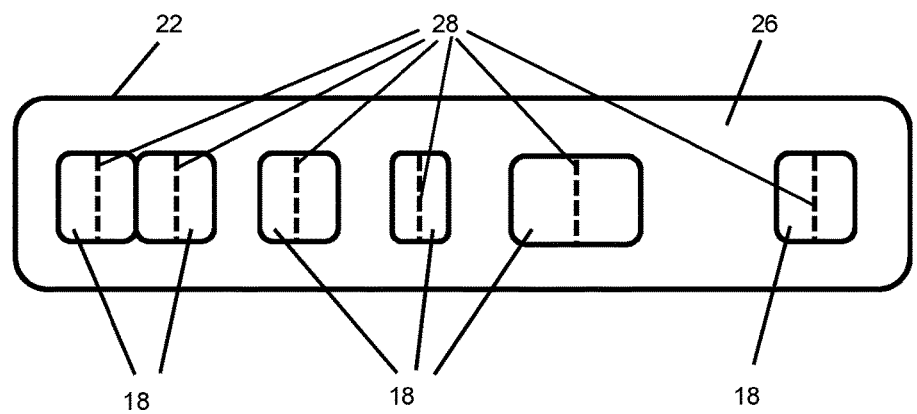
FIG. 4 illustrates a view of the distal end face of an output waveguide slab of an exemplary embodiment.

Different from prior AWGs and spectrometers, the locations of these output waveguides are advantageously not uniformly spaced along the distal (output) end 26 of the output slab waveguide 22, and further advantageously, the passband widths can be not uniform; traditional AWGs have their output devices uniformly spaced along the distal (output) slab waveguide, and have the same passband width for all their output devices. FIG. 4 illustrates this concept, showing OWs 18 located immediately adjacent to each other; spaced regularly; and spaced irregularly. FIG. 4 also illustrates the concept of non-uniform spacing of the center wavelengths 28 for each OW 18, schematically illustrated by a broken line inside the rectangular shape which represents OW. In accordance with the principles of this disclosure, the output waveguides 18 are formed or placed on the distal (output) end 26 of the output slab waveguide 22 only where spectra of interest are located, with placement of the center wavelength of the OW optionally being non-uniform relative to that of other OWs 18 of the AWG 10, and the passband width of each OW optionally being different from other OWs of the AWG. This selective, optionally non-uniform or irregular placement of the output waveguides, and optionally non-uniform or irregular passband width of the output waveguides, eliminates any unused areas of sensitivity in the spectrometer and optimizes the device.

Figure 5:
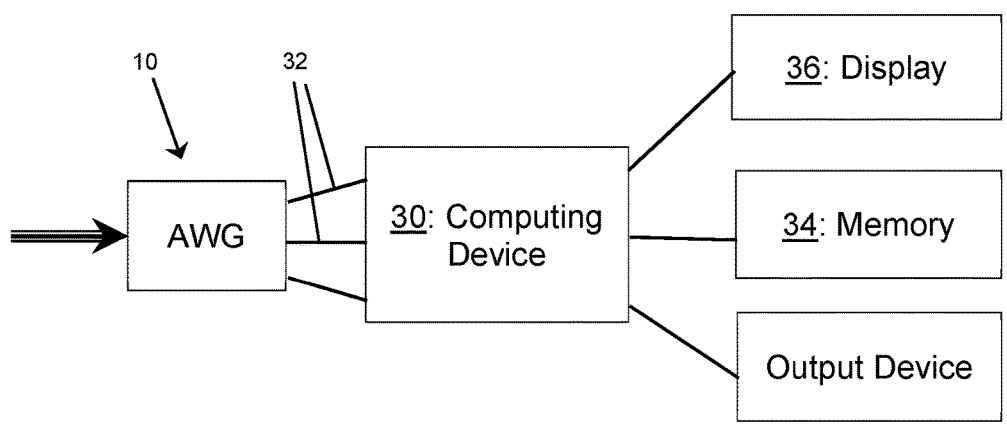
FIG. 5 schematically illustrates an exemplary spectrometer.

Discrete photodetectors 20 (PD) are installed at the output of each of the output waveguides 18. The photodetectors 20 are in electrical communication with devices which can receive their outputs and interpret them so that the device as a whole functions as a spectrometer. By way of non-limiting example, and with reference to FIG. 5, the photodetectors' outputs are in electrical communication with a general purpose computing device 30 having an input device which receives the photodetectors' outputs 32 and converts them to a digital signal. The general purpose computing device includes, but is not limited to, one or more processors, system memory, a bus which connects together the several subcomponents of the computing device, and optional output devices 38 such as displays 36, printers, memory devices 34, etc., as are well known to those of ordinary skill in the art. The memory of the computing device can include a set or sets of logical instructions which can be executed by the processor(s) to process the data represented by the output of the photodetectors to produce outputs representative of the spectral data that was input to the input slab waveguide 14. Alternatively, the computing device can be a special purpose computing device which includes hardware, firmware, or both, which are configured to produce the same output. In this way, AWGs described herein, coupled with a computing device, form a spectrometer. The AWG of FIG. 5 can be any AWG described herein, including those of FIGS. 2 and 3.

Figure 3:
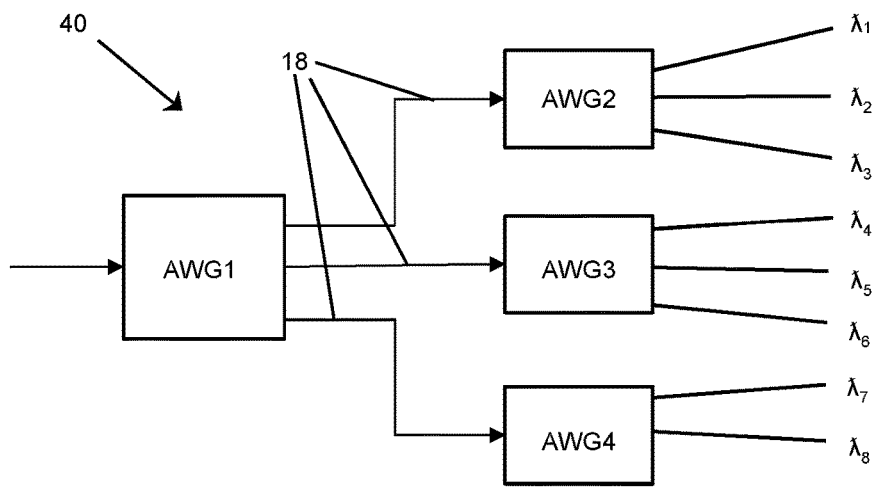
FIG. 3 illustrates portions of another embodiment of a spectrometer in accordance with principles of the present invention.

In accordance with another exemplary embodiment of FIG. 3, an AWG 40 as described herein may be configured to pass a broad band of 'light' for each of the final output waveguides, thus carving up the initial spectrum into smaller pieces or bands. Rather than being fed to a photodetector, each smaller band is then fed to an additional AWG (AWG2, AWG3, AWG4) via waveguides for further division, optionally to further AWGs in series (e.g., up to 100). In this way, AWG1 separates one or more sets of bands of radiation, each centered on a wavelength $\lambda_n$, optionally with different bandwidths around each center wavelength. Each output of AWG1 is fed to either the computing device or to another AWG (AWG2, AWG3, AWG4), which then similarly separates the 'light' into a band of radiation centered on a wavelength $\lambda$, (again, with the option that the bandwidths can be different or the same for each center wavelength $\lambda$). These outputs can in turn be passed onto additional AWGs in the same manner for further refinement, or to a computing device for processing, as described elsewhere herein.

The AWG devices described herein have a single optical waveguide input that may originate from a spectrographic system. The output of the AWG device is thus an electrical signal from each photodetector corresponding to the specified design for passband and center wavelength.

The wavelengths that can be interrogated using devices described herein are a function of the materials used and the geometry of the device. While not being limited to a particular implementation, a preferred embodiment of an AWG as described herein is formed using currently common methods of vapor deposition and photoresist etching, which itself is well-understood by those of ordinary skill in the art and is not further detailed herein. The materials selected for portions of the device must be transparent within the entire wavelength range of interest. For operation to vacuum ultraviolet (VUV), this is very limiting because very few materials work in that range that are capable of being used in nanofabrication and can actually form waveguides. For example, a variety of fluoride compounds (MgF, NaF) are used to make mechanically polished lenses to VUV. Outside of VUV, more traditional material systems, such as silicon-on-insulator or SiON, can be used. While silicon-on-insulator may work for certain wavelengths, for other wavelengths it may not be the preferred material system, as the wavelength range needed for the specific application will determine which materials can be used. By way of another non-limiting example, $SiO_2$ (quartz) and $Al_2O_3$ (aluminum oxide) are potential material systems that can be used for functionality in the Vacuum UV range. Yet further optionally, a ridge waveguide with SiO2 as the substrate and $Al_2O_3$ as the waveguide can also be used. Those of ordinary skill in the art are well acquainted with the options for material selection in this context, particularly with respect to those materials' optical transmissibility characteristics, and thus how to select a particular material for use in constructing a device as described herein for interrogation of a particular wavelength band.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

That which is claimed is:

1. An arrayed waveguide grating comprising:
   an input waveguide;
   an input slab waveguide having an input side and an output side, the input waveguide being optically connected to the input slab waveguide input side;
   an output slab waveguide having an input side and an output side;
   a plurality of optical waveguides having different optical lengths optically connecting the input slab waveguide output side to the output slab waveguide input side;
   a plurality of output waveguides optically connected to the output slab waveguide output side; and
   wherein the plurality of output waveguides are discontinuously and irregularly spaced along the output slab waveguide output side.

2. An arrayed waveguide grating according to claim 1, wherein the plurality of output waveguides each have a passband width, and at least two of said passband widths are different.

3. An arrayed waveguide grating according to claim 1, further comprising:
   a photodetector attached to each output waveguide.

4. A spectrometer comprising:
   an arrayed waveguide grating according to claim 3; and
   a computing device in signal communication with each photodetector.

5. A spectrometer according to claim 4, wherein the computing device comprises a memory including logical instructions configured to analyze signals when received from a photodetector as spectrographic data.

6. A cascaded arrayed waveguide grating device comprising:
   at least two arrayed waveguide grating devices according to claim 1 in series.

7. An arrayed waveguide grating comprising:
   an input waveguide;

an input slab waveguide having an input side and an output side, the input waveguide being optically connected to the input slab waveguide input side;

an output slab waveguide having an input side and an output side;

a plurality of optical waveguides having different optical lengths optically connecting the input slab waveguide output side to the output slab waveguide input side;

a plurality of output waveguides optically connected to the output slab waveguide output side;

wherein the plurality of output waveguides are discontinuously spaced along the output slab waveguide output side; and wherein the plurality of output waveguides each have a passband width, and at least two of said passband widths are different.

* * * * *